United States Patent
Aybay

(10) Patent No.: US 6,185,221 B1
(45) Date of Patent: Feb. 6, 2001

(54) METHOD AND APPARATUS FOR FAIR AND EFFICIENT SCHEDULING OF VARIABLE-SIZE DATA PACKETS IN AN INPUT-BUFFERED MULTIPOINT SWITCH

(75) Inventor: Günes Aybay, Sunnyvale, CA (US)

(73) Assignee: Cabletron Systems, Inc., Rochester, NH (US)

( * ) Notice: Under 35 U.S.C. 154(b), the term of this patent shall be extended for 0 days.

(21) Appl. No.: 09/188,431

(22) Filed: Nov. 9, 1998

(51) Int. Cl.[7] ................................................... H04L 12/56
(52) U.S. Cl. .......................... 370/412; 370/416; 709/240; 710/240
(58) Field of Search ...................... 370/411, 412, 370/413, 414, 415, 416, 419, 428, 429, 397, 399, 461, 462, 465, 395; 710/39, 40, 44, 49, 50, 111, 112, 113, 119, 120, 241, 242, 243, 244; 709/240

(56) References Cited

U.S. PATENT DOCUMENTS

| 5,255,265 | 10/1993 | Eng et al. ............................... 370/60 |
| 5,267,235 | * 11/1993 | Thacker ................................ 370/414 |
| 5,471,590 | 11/1995 | Melo et al. ............................ 395/288 |
| 5,500,858 | 3/1996 | McKeown ............................... 370/60 |
| 5,517,495 | 5/1996 | Lund et al. ............................ 370/60 |
| 5,561,669 | 10/1996 | Lenney et al. ....................... 370/60.1 |
| 5,590,123 | 12/1996 | Lyles et al. ........................... 370/397 |
| 5,631,908 | 5/1997 | Saxe .................................... 370/235 |
| 5,689,508 | 11/1997 | Lyles .................................... 370/391 |
| 5,923,656 | * 7/1999 | Duan .................................... 370/412 |
| 5,956,342 | * 9/1999 | Manning .............................. 370/414 |
| 5,996,019 | * 11/1999 | Hauser ................................. 370/429 |

* cited by examiner

Primary Examiner—Chi H. Pham
Assistant Examiner—Steven Nguyen
(74) Attorney, Agent, or Firm—Law Offices of Mark A. Wilson; Mark A. Wilson

(57) ABSTRACT

An input-buffered multipoint switch having input channels and output channels includes multilevel request buffers, a data path multiplexer, and a scheduler. The switch has a distinct multilevel request buffer associated with each input channel and each request buffer has multiple request registers of a different request buffer priority. The request registers store data cell transfer requests that have been assigned quality of service (QoS) priorities, where the QoS priorities are related to packet source, destination, and/or application type. The multilevel request registers are linked in parallel to the scheduler to allow arbitration among requests of different input channels and different request buffer priority levels. The preferred arbitration process involves generating QoS priority-specific masks that reflect the output channels required by higher QoS priority requests and arbitrating among requests of the same QoS priority in QoS priority-specific multilevel schedulers. Sorting requests by QoS priority allows the switch to schedule a high throughput of packets while adhering to QoS requirements.

23 Claims, 12 Drawing Sheets

METHOD AND APPARATUS FOR FAIR AND EFFICIENT SCHEDULING OF VARIABLE-SIZE DATA PACKETS IN AN INPUT-BUFFERED MULTIPOINT SWITCH

TECHNICAL FIELD

The invention relates generally to the scheduling of packets in a high-bandwidth input-buffered multipoint switch, for instance as used in gigabit ethernet networks. More particularly, the invention relates to a non-blocking scheduler that utilizes a parallel multilevel arbitration method.

BACKGROUND OF THE INVENTION

Networks are widely used to transfer voice, video, and data between various network devices such as telephones, televisions, and computers. Data transmitted through a network is typically segmented into packets, and under some network protocols data is segmented into fixed-length cells. For example, Asynchronous Transfer Mode (ATM) protocol requires 53-byte cells, with 5 bytes of each cell designated for a header and 48 bytes of each cell designated for payload. Other network protocols, such as ethernet or Internet protocol, carry data in variable-size packets.

Switches are integral parts of most networks. Switches receive packets from input channels and direct the packets to the appropriate output channels of the switch. Typical switches have three components: a physical switch fabric to provide the connections from input channels to output channels, a scheduling mechanism to direct traffic when multiple packets arrive on different input channels destined for the same output channel, and a buffering or queuing mechanism at the switch input or output to accommodate traffic fluctuations without undue packet loss. FIG. 1 is a diagram of a prior art switch 10 that has four input channels 12, 14, 16 and 18 and four output channels 20, 22, 24 and 26. The switch has a serial input queue 28, 30, 32, and 36 for each input channel, a crossbar physical switch 38, and a crossbar scheduler 40. The crossbar scheduler receives a signal, referred to as a request, from an input queue. The request dictates the output channel or channels that will receive the queued packet. The scheduler arbitrates between competing requests and sends a signal, referred to as a grant, back to the input buffers that have been selected to deliver a packet.

In switches such as the switch 10 described in reference to FIG. 1, each input queue 28–36 provides requests to the scheduler 40, one at a time, on a first-in-first-out (FIFO) basis and the scheduler arbitrates among the four requests received from the four input queues, with a goal of maximizing utilization of the input channels 12–18 and output channels 20–26 of the switch. As a grant is issued to a particular input channel to access a target output channel or channels, a new request is accessible by the scheduler in place of the granted request.

A problem known as head-of-line (HOL) blocking is created when one of the requests at the head of a queue line is a request for an output channel that is not available. HOL blocking is common when a multicast request is made, because there is a lower probability that all of the output channels for the multicast request will be available immediately. When a request from a particular input channel is forced to wait until all output channels are available, all of the packets associated with the particular input channel are also forced to wait, thereby slowing the transfer of data from that input channel.

As one remedy for solving HOL blocking problems, parallel input queues have been implemented. Parallel input queues provide a separate FIFO queue for each output channel of the switch, with each queue providing a corresponding request to the scheduler. Referring to FIG. 2, an N input channel by N output channel switch requires N input queues 46 for each input channel, for a total of $N^2$ input queues. With an $N^2$ scaling factor, the number of input queues connected to the crossbar scheduler 50 may be very high. For example, in a 16×16 switch, 256 separate queues are required. In spite of the added complexity, the advantage that the parallel design provides is that, with respect to any one of the input channels, a series of requests for available output channels is not held up by a single request for in-use output channels.

A variety of arbitration techniques can be used with parallel input channels to provide an efficient throughput through a switch. For example, maximum matching algorithms are designed in an attempt to assign output channels to input channels in such a way that a maximum number of transfers occur simultaneously. However, under heavy load conditions, maximum matching algorithms can prevent some requests from being granted, creating a new blocking problem. For example, referring to FIG. 3, input channel 1 is represented as requesting a transfer of cells from its output-distributed queue 54 to output channel 1 only, while input channel 2 is requesting a transfer of cells from its output-distributed queue 56 to output channels 1 and 2. Under a maximum matching approach, input channel 1 transmits cells to output channel 1 and input channel 2 transmits cells to output channel 2. However, input channel 2 will be blocked from transferring cells destined for output channel 1, since this would require the cell transfer from input channel 1 to output channel 1 to stop, and as a result, only output channel 1 would be utilized. As shown in FIG. 4, sending cells from input channel 2 to output channel 1 causes input channel 1 and output channel 2 to remain idle and does not achieve maximum matching.

Arbitration methods developed to optimize performance of high speed switches utilizing parallel input queues are disclosed in U.S. Pat. No. 5,500,858, entitled "Method and Apparatus for Switching Cells in an Input-Queued Switch," issued to McKeown and in U.S. Pat. No. 5,517,495, entitled "Fair Prioritized Scheduling in an Input-Buffered Switch," issued to Lund et al. Although these arbitration approaches are effective for their intended purpose, they both require that an N×N switch have $N^2$ distinct FIFO input queues. Since there are $N^2$ distinct FIFO input queues, there will also be $N^2$ requests delivered to the scheduler. As the number of input and output channels increases, the complexity of providing $N^2$ input queues and sending $N^2$ requests to the scheduler becomes costly and difficult to implement.

In addition to the problem of added complexity, the output-distributed queue architecture does not easily support multicast requests, which are more common in network protocols such as ethernet than in network protocols such as ATM. For example, in order to utilize the output-distributed architecture of FIG. 2 to satisfy a multicast request, the cell that is to be multicasted must either be replicated into all of the output channel queues that are indicated by the request or a separate multicast queue must be established in addition to the $N^2$ queues already present.

A third concern is that output distributed queue architectures do not readily enable a switch to provide quality of service (QoS) guarantees for packet transfers across a switch. For example, in an enterprise network, there are many different packet flows having different sources, destinations, and packet protocols. Because of user-specific needs, some packet flows are deemed more critical to the enterprise than other packet flows and can be prioritized accordingly. For example, a packet flow related to a mission-critical application (i.e., SAP, People Soft, Baan, or Custom Client/Server applications) can be assigned a different QoS priority than HTTP-based Internet traffic. A QoS priority can then be related to specific forwarding rules or transfer rate limits across the network switch to provide different levels of service. In the queue arrangements of FIGS. 1 and 2, packets, or their related requests, are not differentiated by QoS priority and, as a result, a high priority packet is forwarded through the switch in the same manner as a lower priority packet. In, for example, an enterprise network environment, non-prioritized queue arrangements may mean that packets carrying time-critical video teleconferencing data are treated the same as packets carrying non-time-critical e-mail messages, thereby causing severe degradation in the video teleconferencing performance.

As a result of the shortcomings of conventional output-distributed queue architecture, what is needed is a method and apparatus that limit the number of input queues and the complexity of sending requests to a scheduler, while maintaining fair and efficient scheduling and providing QoS functionality.

SUMMARY OF THE INVENTION

A method and an apparatus for scheduling data packets in a multipoint switch utilize request buffers having multilevel request registers linked in parallel to a scheduler that arbitrates among requests based upon the location of the requests within the multilevel request buffers and based upon a quality of service (QoS) priority assigned to the requests in order to maximize data packet transfer through the switch, while adhering to QoS requirements. To arbitrate among requests based upon request buffer location and QoS priority, the scheduler sorts all of the available requests by QoS priority and issues grants on a QoS priority basis in a channel-by-channel arbitration process. Since there can be more than one request of the same QoS priority stored in a multilevel request buffer of a single channel, the location of a request stored within a multilevel request buffer, referred to as the request buffer priority, is used to award a grant among requests having the same QoS priority. To ensure that conflicting grants are not issued for requests of different QoS priorities, a mask generation and compare process is used to block conflicting requests of lower QoS priority from entering the grant process.

The preferred multipoint switch has sixteen input channels and sixteen output channels, with each input channel having a request buffer with four request registers. The four request registers have different request buffer priorities and the requests stored in the registers are scheduled at least partially based upon their request buffer priorities. The requests also have a QoS priority that is assigned to each request based upon the source, destination, and/or application of the corresponding data packet. There are four QoS priority designations, referred to as control, high, medium, and low and the QoS priority of a packet is unrelated to the request buffer priority of the same packet.

The sixteen request buffers are connected to a data path multiplexer and a scheduler. The four request registers from each of the sixteen request buffers along with four QoS priority registers are connected in parallel to the scheduler, such that the scheduler can simultaneously access all sixty-four of the available requests and identify their respective QoS priorities. The request buffers are filled from peripheral systems and prioritized based upon the age of the requests in the buffer, with the oldest request having the highest request buffer priority and the newest request having the lowest request buffer priority. Whenever a grant is issued in response to a request, the request buffer adjusts on a FIFO basis, thereby leaving a vacant request register at the lowest request buffer priority. The vacant request register then receives a new request that takes on the lowest request buffer priority.

The scheduler of the preferred embodiment includes a mask generator unit, four QoS priority-specific request multiplexing units (RMUs), four QoS priority-specific multi-level schedulers (MLSs), a global resource manager, and a frame counter. The mask generator unit is a circuit that generates three QoS priority-specific masks that are utilized in the scheduling process to indicate which output channels are identified by requests having a QoS priority level higher than a designated minimum QoS priority level. There are only three masks since there can be no higher QoS priority level if the highest priority (i.e., control QoS priority) is the "designated minimum QoS priority level." In the preferred 16×16 switch, QoS priority-specific masks consist of 16-bit vectors where each bit is dedicated to one of the output channels. The three QoS priority-specific masks are generated from the control, high, and medium priority requests. Specifically, the control priority mask is a 16-bit vector that represents all outputs which are being requested by the pending control priority requests, the high priority mask is a 16-bit vector that represents all outputs that are being requested by the pending control priority requests and the pending high priority requests, and the medium priority mask is a 16-bit vector that represents all outputs that are being requested by the combination of pending control priority requests, pending high priority requests, and pending medium priority requests.

The four QoS priority-specific RMUs are circuits that sort all of the incoming requests based on QoS priority and then compare the sorted requests to the QoS priority-specific masks. For each input channel, the priority-specific RMUs output to the MLSs as many as four requests (one for each of the four request buffer priorities). In operation, the RMU for a particular QoS priority cycles through the requests for each channel and sorts out any requests that are in the particular QoS priority. If a channel, for example channel 0, has any of the QoS priority requests active in the request buffer registers, then the requests will be forwarded through the RMU. In the case of the high, medium, and low priority RMUs, the forwarded requests are sent through mask compare units. However, in the case of the control priority RMU, mask compare units are not necessary because there are no higher priority requests that need to be masked out of the MLSs. In the mask compare process, requests from a specific QoS priority are compared to a mask that represents all requests of higher QoS priority. For example, the high priority requests are compared to the control priority mask to block high priority requests that conflict with pending control priority requests. The mask compare process prevents conflicting lower priority requests from entering the MLSs and guarantees that each input only receives a single grant in one arbitration cycle and that each output is allocated to only one input. Because the control priority is the highest QoS priority, no masking process is required in the control priority RMU. Once the mask compare process is complete within each RMU, any requests from the four request buffer priority levels that have not been masked out are forwarded to the respective QoS priority-specific MLS.

The four QoS priority-specific MLSs are arranged to receive QoS priority-sorted and masked (except for the control priority) requests from the RMUs. The MLSs utilize a strict request buffer priority scheme to arbitrate among requests of the same QoS priority and from the same channel. In addition to the strict request buffer priority scheme, the MLSs utilize a round-robin scheme to arbitrate among requests of the same QoS priority but different channels. To facilitate scheduling on a request buffer priority basis, each QoS priority-specific MLS includes four 16-stage round-robin schedulers that correspond to the four request buffer priorities. In operation, the round-robin schedulers receive request buffer prioritized requests from the RMUs for a single QoS priority and a single channel and then compare input and output vectors to the requesting channel and to the request vector to determine if a grant can be issued. Any grants issued from the round-robin schedulers for a particular QoS priority are forwarded to a QoS priority-specific priority encoder unit.

The QoS priority-specific priority encoder units within each MLS are the circuits that are responsible for implementing the request buffer priority scheme. When there are one or more possible grants transmitted to a priority encoder unit from the four round-robin schedulers within an MLS, the priority encoder unit picks the grant corresponding to the request with the highest request buffer priority and passes the QoS priority-specific grant on to the requesting channel.

In order to ensure that conflicting grants are not issued within each MLS, a local resource manager is located within each MLS. Each local resource manager receives updated input and output vectors from a global resource manager at the start of each arbitration cycle. Each time a grant is issued within a particular MLS, the input vector and output vector within the MLS are updated appropriately by the local resource manager. Upon completion of an arbitration cycle, updated QoS priority-specific input vectors and output vectors are sent from each local resource manager to the global resource manager.

The global resource manager is responsible for maintaining the status of global input and output vectors within the scheduler. As stated, the global resource manager receives updated input and output vectors from each MLS at the completion of each arbitration cycle. Upon receiving the updated QoS priority-specific input and output vectors, the global resource manager aggregates all of the priority-specific vectors to create updated global input and output vectors. The updated global input and output vectors are then fed back to the local resource managers before the next arbitration cycle.

Round-robin managers located within each of the priority-specific MLSs promote fairness between requests of the same QoS priority level but of different channels. Under the round-robin scheme, a particular channel is initially designated as having the highest round-robin priority and when the high priority channel receives a grant the high round-robin priority designation is shifted to the next channel. Note that round-robin priority is relevant to the channel priority order inside the four round-robin schedulers of each MLS and is different from the request buffer priority and the QoS priority related to each request. Round-robin priority is maintained independently by each MLS and requests are processed between channels in round-robin priority such that the requests from channels with higher round-robin priority are granted access to output channels before requests from lower round-robin priority channels.

The frame counter within the scheduler provides timing signals in the form of clock signals and framing pulses to the MLSs. The timing signals provided by the frame counter ensure that the four QoS priority-specific arbitration processes are synchronized.

In the operation of one arbitration cycle, the scheduler first generates three QoS priority-specific masks. Next, the sixty-four requests are sorted and processed by four QoS priority-specific request multiplexer/multilevel scheduler combinations. Each request multiplexer/multilevel scheduler combination processes the requests on a channel-by-channel basis over sixteen clocks, with each combination maintaining its own round-robin channel priority. Grants are issued from each QoS priority-specific multilevel scheduler and channel conflicts between grants are prevented by the mask compare process that is performed in the request multiplexers.

An advantage of the invention is that the sixteen request buffers with four request registers per buffer utilized in a 16×16 switch are significantly less complex than the 256 queues required for a 16×16 switch using a conventional output-distributed scheduling architecture. In addition, the multilevel request buffers eliminate the HOL blocking problem because the scheduler has simultaneous and in-parallel access to more than one request for each input channel. Further, by dividing the scheduler into QoS priority-specific scheduling modules, QoS requirements can be implemented in a high volume non-blocking switch circuit.

DETAILED DESCRIPTION

Figure 1:
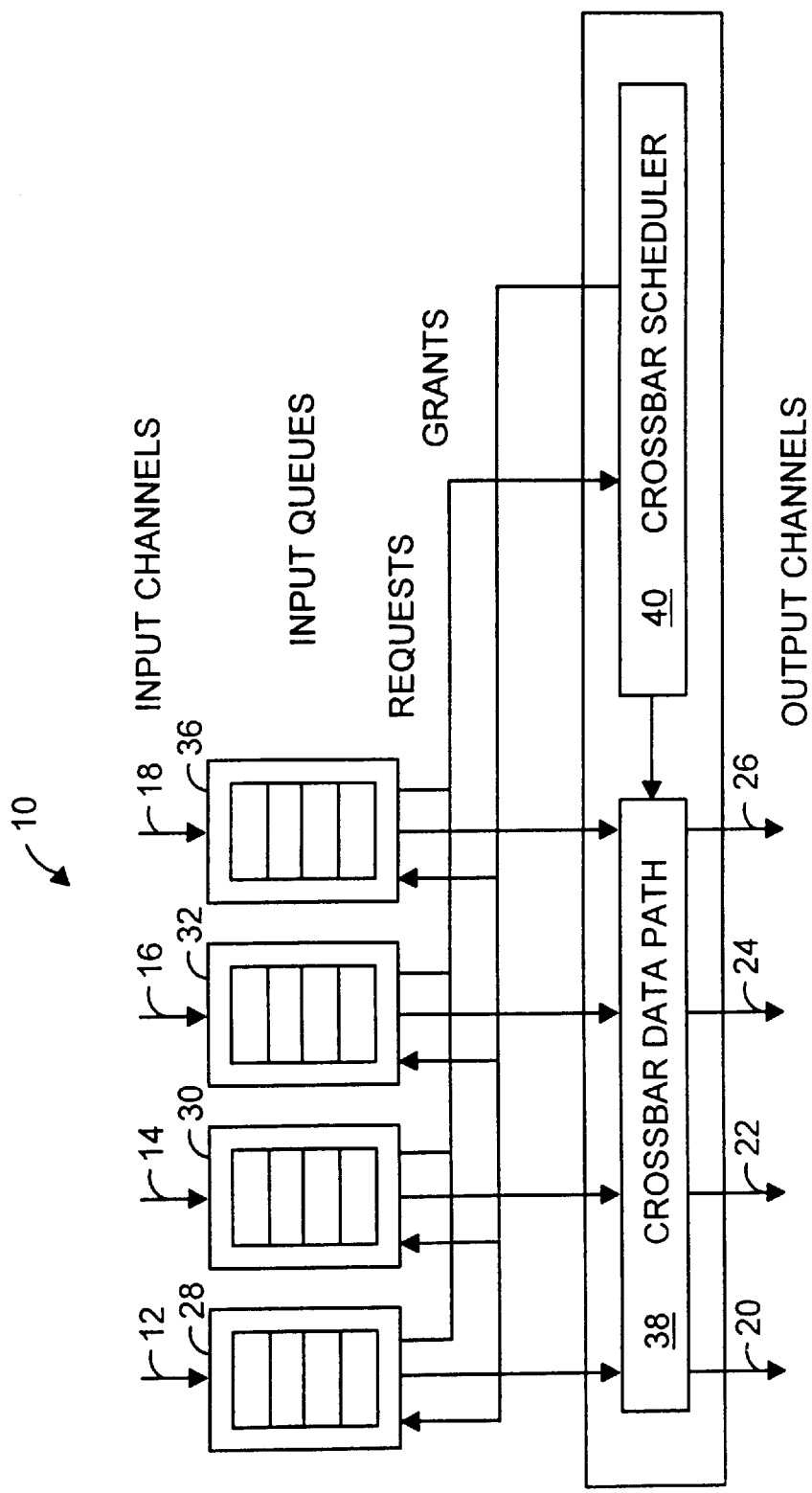
FIG. 1 is a diagram of a prior art switch that has four input channels and four output channels.
Figure 2:
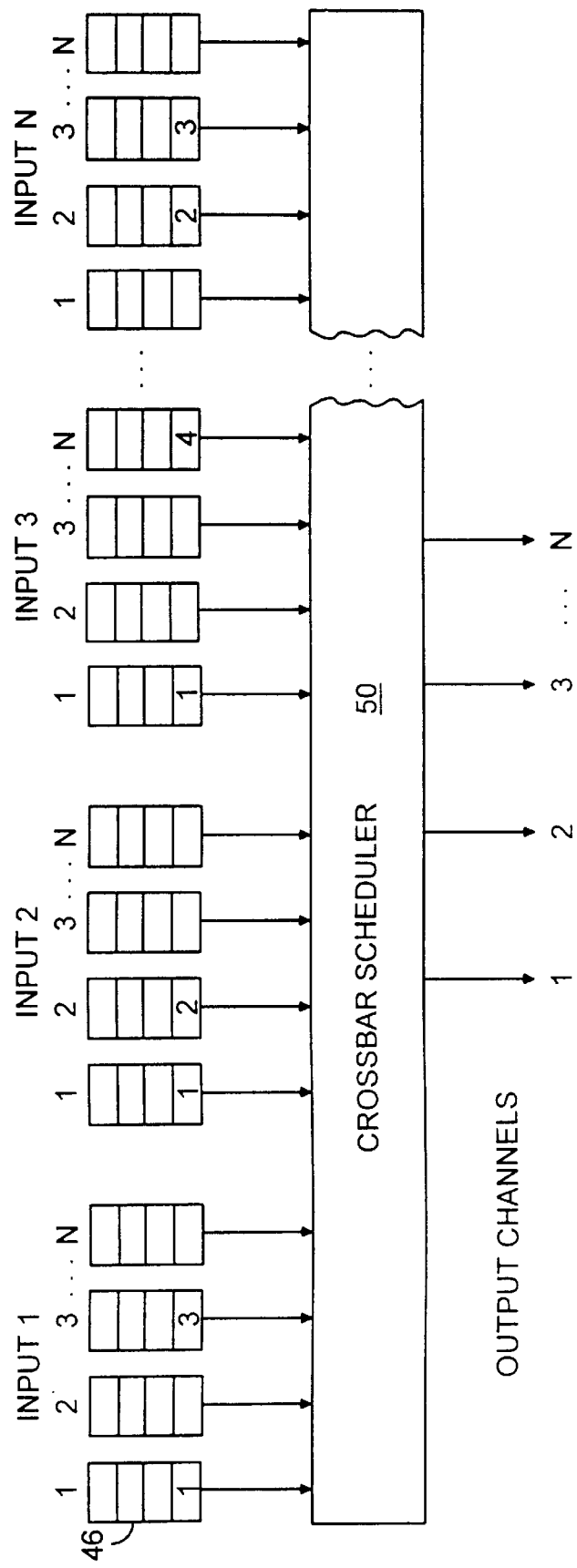
FIG. 2 is a prior art N input channel by N output channel switch with $N^2$ output-distributed input queues.
Figure 3:
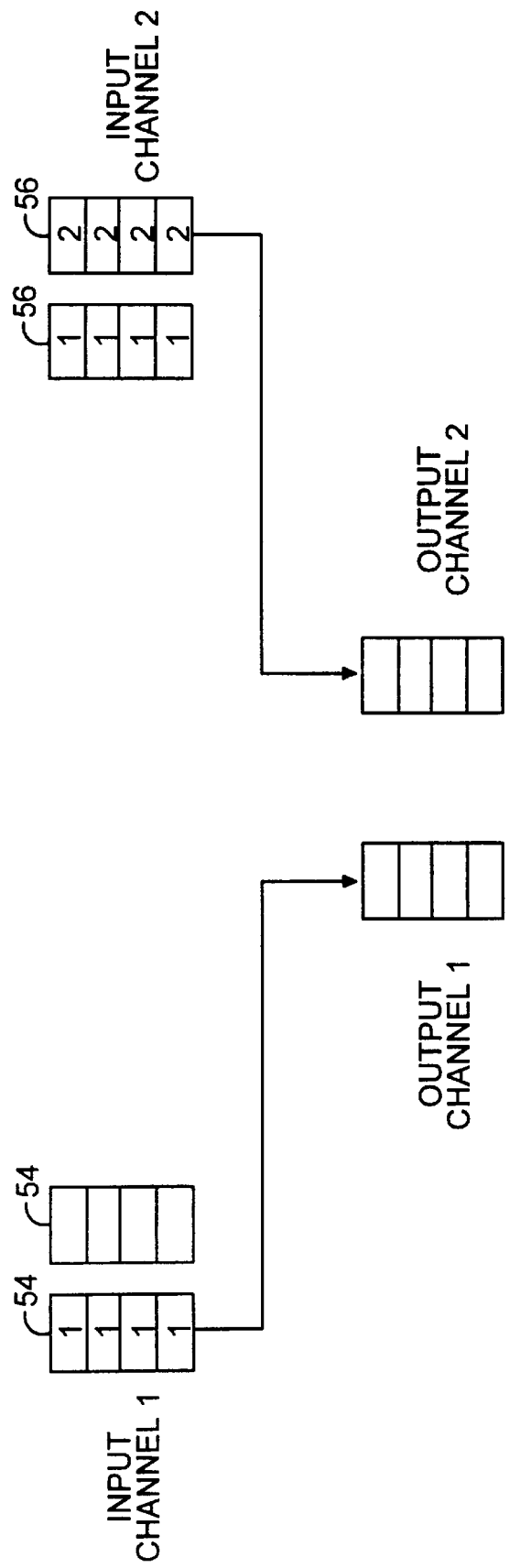
FIG. 3 is a depiction of the transferring of cells from output-distributed input queues to output channels where maximum matching between input and output channels is achieved using prior art techniques.
Figure 4:
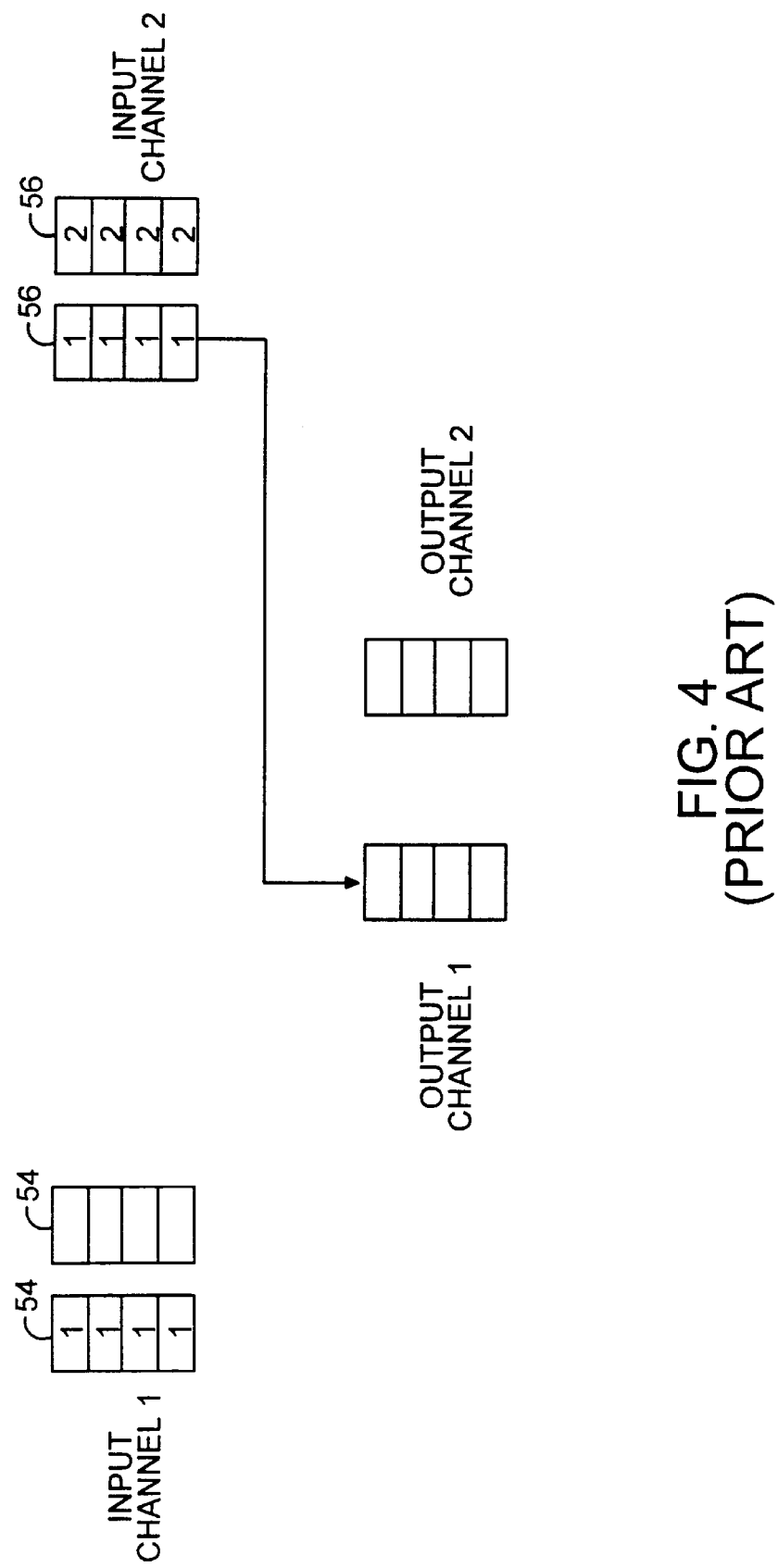
FIG. 4 is a depiction of the transferring of cells from output-distributed input queues to output channels where maximum matching between input and output channels is not achieved using the prior art techniques.
Figure 5:
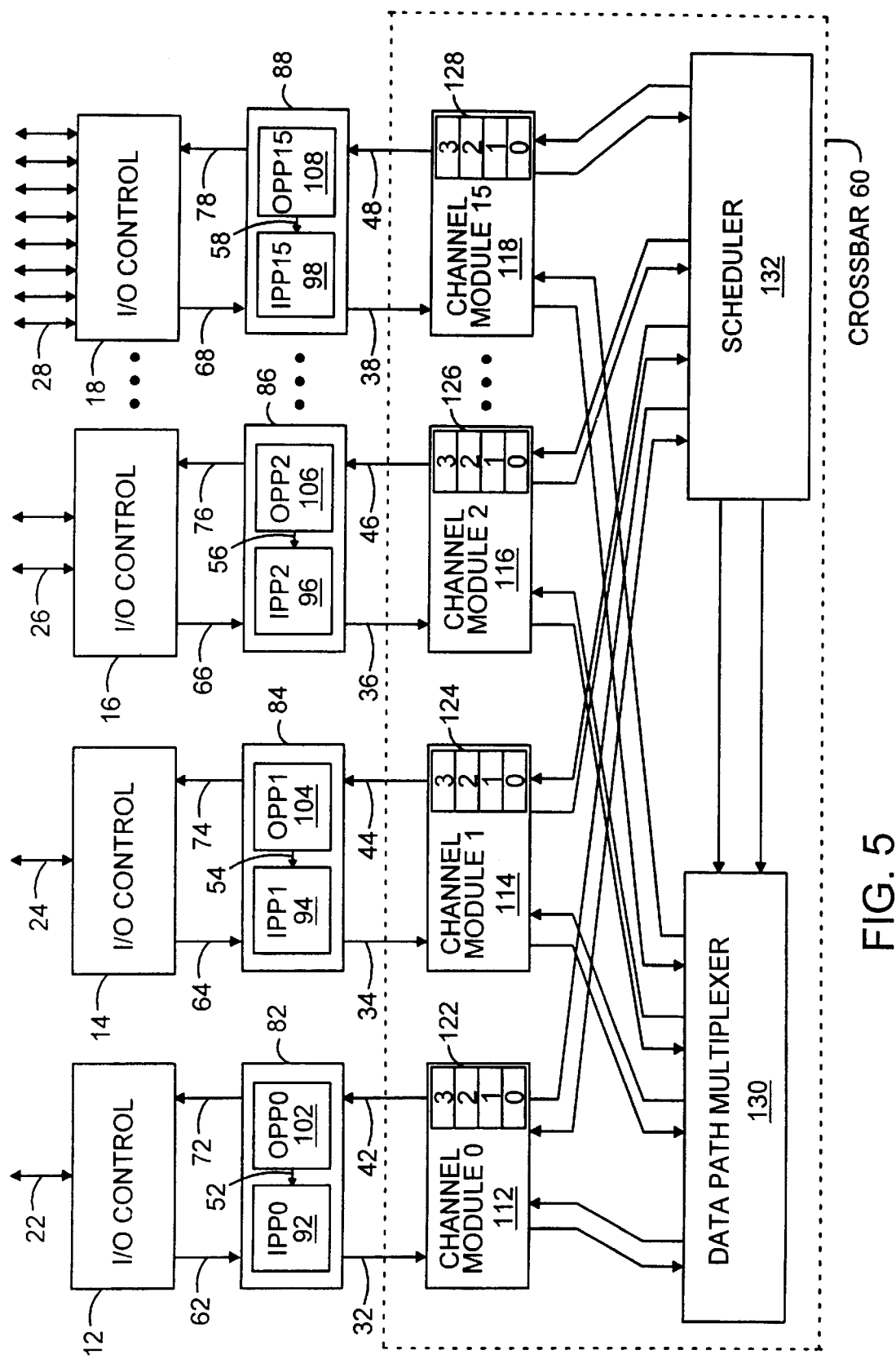
FIG. 5 is a diagram of the switch architecture in accordance with the present invention.

FIG. 5 is a depiction of the preferred architecture of a multipoint switch that is compatible with network protocols such as ethernet and TCP/IP. Although a 16-channel switch is shown for description purposes, the switch may have a different number of channels. The preferred architecture includes data links 22, 24, 26, and 28 connected to input/output (I/O) controllers 12, 14, 16, and 18. The I/O controllers are connected to channel-specific packet processing units 82, 84, 86, and 88, which are connected to channel modules 112, 114, 116, and 118 of a switch crossbar 60. The channel modules are connected separately to a data path multiplexer 130 and a scheduler 132. The preferred embodiment of the invention provides a method and apparatus for fair and efficient scheduling of variable-size data packets in an input buffered multi-channel switch.

The data links 22–28 connected to the I/O controllers 12–18 provide the medium for transferring packets of data into and out of the switch. In a preferred embodiment, the number of data links connected to each I/O controller is based on the bandwidth capacity of the data link. For example, the single and double data links 22, 24, and 26 represent 1,000 Megabits per second (Mbps) connections and the eight data links 28 represent 10 and/or 100 Mbps connections, although these connection bandwidths can be smaller or larger. In addition, the physical makeup of the data links is preferably twisted pair wires and/or single mode optical fiber, although other data links such as coaxial cable, multi-mode optical fiber, infrared, and/or radio frequency links are possible.

The I/O controllers 12–18 connected to the data links 22–28 and the packet processing units 82–88 provide the packet control between the data links and the internal switch fabric, which includes the packet processing units and the crossbar 60. The I/O controllers receive incoming packets from the data links and transform the packets into digital data packets that are compatible with the switch. The I/O controllers also transmit data out onto the data links. The I/O controllers may buffer incoming and/or outgoing packets and the I/O controllers may perform some network traffic control, such as identifying the appropriate QoS priority for packets. Finally, the I/O controllers supply the packet processing units via data paths 62, 64, 66, and 68 with packets for processing through the crossbar and receive packets from the packet processing units via data paths 72, 74, 76, and 78.

The packet processing units 82–88 are preferably broken up into input packet processors (IPPs) 92, 94, 96, and 98 and output packet processors (OPPs) 102, 104, 106, and 108. The IPPs manage packet traffic between the I/O controllers 12–18 and the switch crossbar 60. More specifically, the IPPs receive packets from the I/O controllers in their original variable-length format and then segment the variable-length packets into fixed-length switching blocks before the switching blocks are sent to the crossbar via unidirectional data paths 32, 34, 36, and 38. The variable-length packets are segmented into fixed-length switching cells to enable orderly and efficient transfer of packets through the crossbar. The majority of the data that makes up a particular switching cell is data from an associated packet, but some of the data in the switching cell is added header information that is used to transfer internal messages between the packet processors and the crossbar as part of an internal messaging protocol. The data and the messaging header are multiplexed together for simplicity of design and efficiency purposes.

Figure 6:
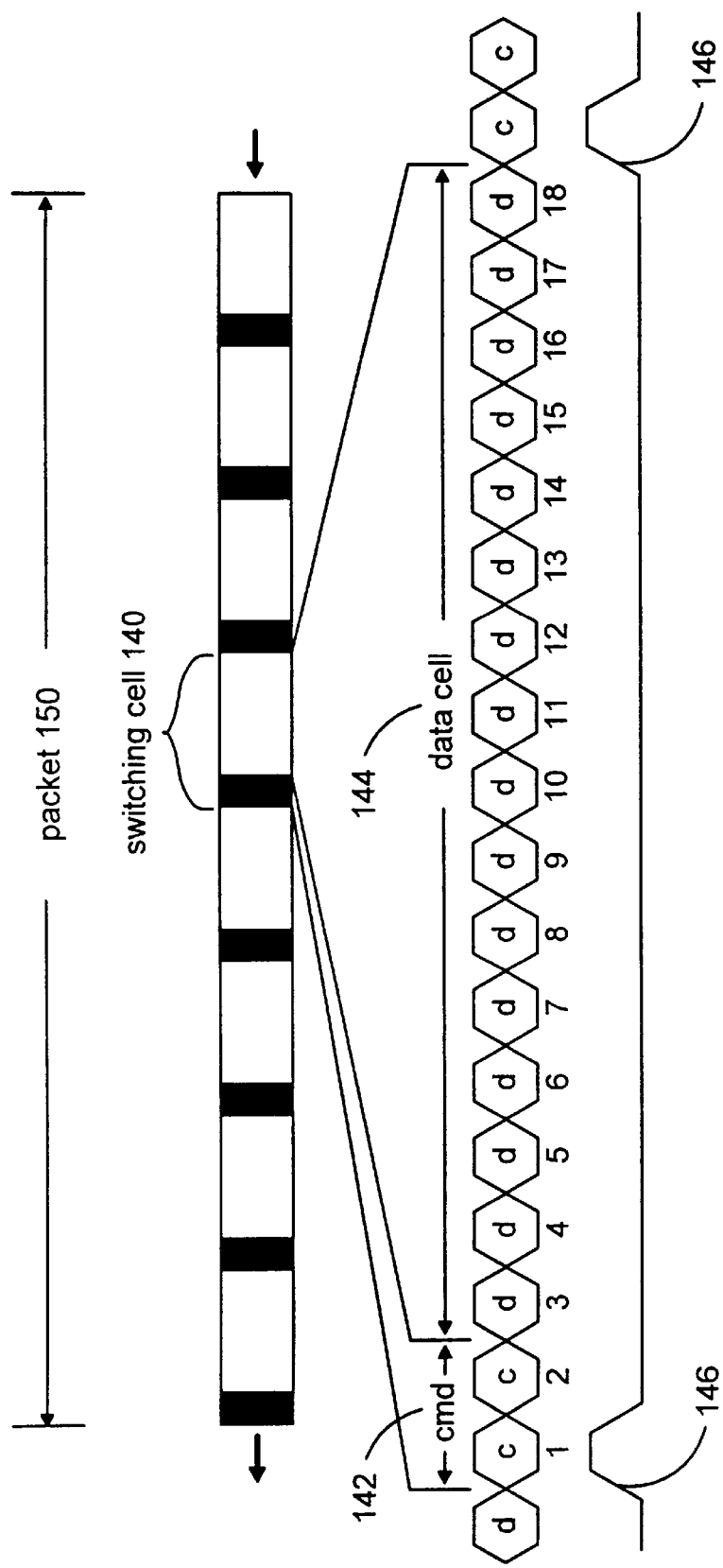
FIG. 6 is a diagram of a data packet and an expanded switching cell that is transmitted through the switch fabric of FIG. 5.

FIG. 6 is a depiction of a preferred 36-byte switching cell 140. The fixed-length switching cell consists of a 4-byte command cell 142 and a 32-byte data cell 144. Using 16-bit channels, each switching cell is sent through the switch over eighteen clocks and a framing pulse 146 is used to indicate the termination of one switching cell and the beginning of an adjacent switching cell. Each command cell consists of two command fields. The first command field contains a request or response that is used to exchange messages related to switching arbitration. The second command field contains a data identifier that carries information relating to the data cell in the current switching cell. The data cell carries the data that is a part of a larger variable-length packet 150 from which the switching cell was segmented. After the switching cells pass through the data path multiplexer, the switching cells are reassembled into variable-length packets by the OPPs for transmission within the network.

Referring back to FIG. 5, switching cells are transmitted between the IPPs/OPPs 92–98 and 102–108 and the corresponding channel modules 112, 114, 116, and 118 via unidirectional data paths 32–38 and 42, 44, 46, and 48. The channel modules execute a synchronization protocol for each channel, perform a cyclic redundancy check (CRC) for incoming requests, and generate a CRC for outgoing acknowledge messages. The channel modules are also responsible for routing the command and data cells to the proper locations within the switch. For efficiency purposes, the command cells that are transmitted between the channel modules and the IPPs/OPPs are piggybacked as described above onto data cells to form complete 36-byte switching cells, even though the command cells are not likely to be directly related to the data in the data cells with which they are traveling. The channel modules demultiplex incoming command cells from data cells and write the request portions of the command cells to multilevel request buffers 122, 124, 126, and 128.

Figure 7:
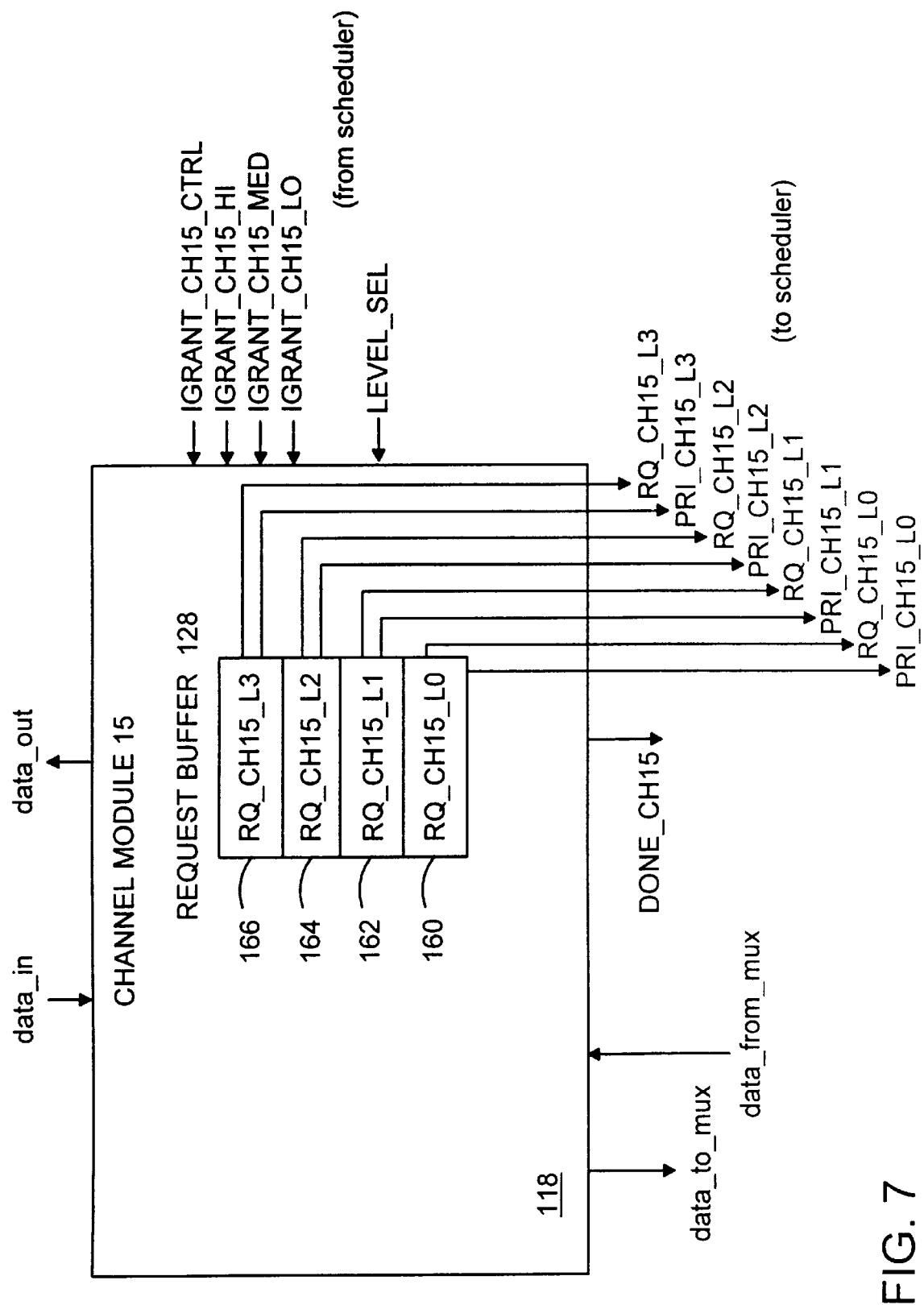
FIG. 7 is an expanded diagram of a channel module as shown in FIG. 5.

FIG. 7 is an expanded diagram of a channel module 118, using channel module 15 as an example. The channel module of FIG. 7 has a request buffer 128 that can store four requests and four QoS priority indicators in four request registers 160, 162, 164, and 166. The request buffer can provide the four requests and the four QoS priority indicators to the scheduler in parallel. In a preferred 16×16 switch, there can be up to four requests stored in each of sixteen request buffers for a total of sixty-four requests. In comparison to the preferred switch, a conventional 16×16 switch with output-distributed queues would require $N^2$, or 256, request buffers and would provide $N^2$, or 256, requests to a scheduler per arbitration cycle. Although in the preferred 16×16 switch each channel module includes a request buffer with four request registers, the exact number of request registers in each request buffer is not critical to the invention and can be adjusted as needed.

The request buffers 122–128 shown in FIGS. 5 and 7 are filled from the IPPs 92–98 and requests are prioritized within each buffer based upon time, where the oldest request has a highest request buffer priority. In FIG. 7, the request buffer 128 for channel 15 has four request registers 160, 162, 164, and 166 designated from bottom to top as level 0 (L0), level 1 (L1), level 2 (L2), and level 3 (L3), where register L0 has the highest request buffer priority and register L3 has the lowest request buffer priority. In this request buffer priority scheme, register L0 contains the oldest request and register L3 contains the newest request. Whenever a grant is issued in response to a request, the request buffer adjusts on a FIFO basis, thereby leaving a vacant request register at the lowest request buffer priority, L3. The vacant request register 166 is then available to receive a new request from the IPP 98.

In addition to the request buffer priority, the requests stored in the request buffers 122–128 represent packets with different QoS priority. As described above, the QoS priority may be based upon the source of the data, the destination of the data, and/or the type of data. In the preferred embodiment, there are four QoS priority designations which are referred to as control, high, medium, and low priority, with control being the highest QoS priority and low being the lowest QoS priority. The QoS priority is unrelated to the request buffer priority and as a result, any combination of QoS priority requests can be stored in the request buffers. For example, a request buffer may store four control priority requests only, or a request buffer may store a combination of two high priority requests and two low priority requests. Although the requests in the request buffers have QoS priority designations, as stated above the request buffer priority (i.e., L0, L1, L2, and L3) is set by the age of the packets relative to other packets. When a request is granted to the channel module, the request buffer adjusts on a FIFO basis, thereby leaving a vacant request register at register L3 regardless of the QoS priorities of other requests stored in the request buffer. In sum, each packet stored in a request buffer has a time-based priority and a QoS-based priority that is unrelated to the time-based priority.

FIG. 7 also depicts the specific input and output links associated with each channel module, using channel module 15 as an example. The data_in and data_out links located at the top of the channel module 118 are used to transport command cells, data cells, grants, and level selects between the channel module and the IPP/OPP. The input grant links (IGRANT_CH15_CTRL, IGRANT_CH15_HI, IGRANT_CH15_MED, and IGRANT_CH15_LO) and level select link (LEVEL_SEL) located at the right side of the channel module are used to transport the QoS priority-specific grant signals and the level select signal from the scheduler to the channel module. The IGRANT_CH15 signals represent QoS priority-specific grants that have been issued by the scheduler for channel 15. The LEVEL_SEL signal represents the request buffer priority level (i.e., L0, L1, L2, and L3) that corresponds to the IGRANT_CH15 signal. For example, the LEVEL_SEL signal identifies one of the levels L0 through L3 corresponding to a grant received from one of the four grant links.

The channel module request links for level 0 through level 3 (RQ_CH15_L0 through RQ_CH15_L3), the QoS priority identifiers (PRI_CH15_L0 through PRI_CH15_L3), and the done link (DONE_CHN) located at the bottom right of the channel module 118 are used to transport the channel requests, the QoS priorities, and a done signal to the scheduler. The four request links and the four QoS priority links are routed to the scheduler in parallel and provide the four requests and associated QoS priority identifiers to the scheduler simultaneously. As will be discussed further, providing parallel delivery of four requests and associated QoS priority identifiers helps to minimize the HOL blocking problem discussed above. The request links in the preferred 16×16 switch are 16-bit channels that carry requests that include a 16-bit crossbar exit channel descriptor (CEP). The 16-bit CEP has one bit associated with each output channel, and the desired output channels are identified by setting the bits that correspond to the output channels. The QoS priority links are 2-bit channels that carry QoS priority identifiers from the channel modules to the scheduler. The QoS priority identifiers are 2-bit vectors that are set to correspond to one of the four QoS priorities (control, high, medium, low).

The DONE_CH15 signal indicates to the scheduler 132 when the input channel has completed transmitting the current group of switching cells. Switching cells that are segmented from the same packet are ideally transmitted one after another. Since packets are variable length and are therefore made up of a variable number of switching cells, it is preferred that the scheduler be informed when an input channel has completed transferring of a group of switching cells. The DONE_CH15 signal is also used to determine which output channels have become available to receive switching cells. The connections that are identified as "data to and from multiplexer" links (data_to_mux and data_from_mux) located at the bottom left of the channel module 118 are used to transfer data cells to and from the multiplexer.

Although not represented, the channel module 118 can also perform a time-out function to limit the amount of time and therefore the number of cells that can be transferred uninterrupted by a single input/output channel combination. In an embodiment, every time a grant is issued to an input channel, a time-out counter in the corresponding channel module is set to the time-out value. During every successive clock cycle, the time-out counter is decremented and if the input channel cannot complete the transfer within the time-out period, the time-out counter expires and the transfer is terminated. In the preferred embodiment, the time-out counters in the channel modules are set to allow up to 4,096-byte packets to be switched in one uninterrupted event.

Referring back to FIG. 5, the channel modules 112–118 are connected to a data path multiplexer 130 that provides the physical paths for data cell switching between channels. The preferred data path multiplexer has the ability to unicast data cells and to multicast data cells. In the preferred embodiment, the data path multiplexer is a multipoint switch, although in another embodiment the data path multiplexer can be a crossbar switch. The type of data path multiplexer is not critical to the invention.

The channel modules 112–118 are also connected to the scheduler 132. The scheduler utilizes the requests from the channel modules to manage the cell traffic through the data path multiplexer 130 in a manner that maximizes the throughput of switching cells while respecting the QoS priority scheme. The scheduler performs the majority of cell scheduling tasks and is described in detail below.

Figure 8:
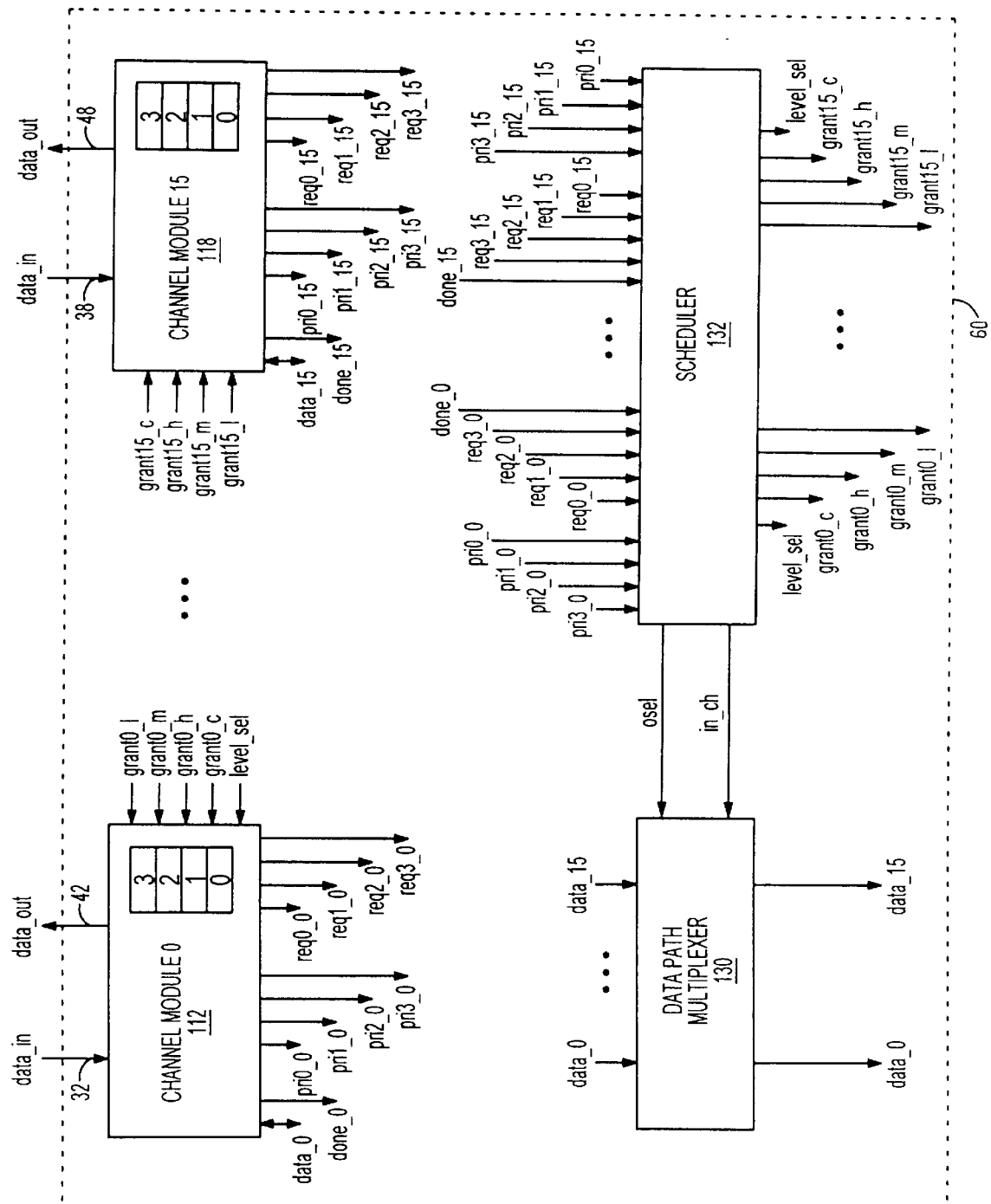
FIG. 8 is a depiction of the crossbar of FIG. 5 that includes a more detailed representation of the connections that are made between the channel modules, the scheduler, and the data path multiplexer in accordance with the invention.

FIG. 8 is a depiction of the crossbar 60 that includes a more detailed representation of the connections that are made between the channel modules 122–128, the scheduler 132, and the data path multiplexer 130. As described above, each channel module transmits four requests, four QoS priority indicators, and a done signal over respective request, QoS priority, and done links. The channel modules transmit data to the data path multiplexer over the data links, and the channel modules receive QoS priority-specific grants and a level select signal from the scheduler over the grant and level select links. The scheduler transmits output channel select signals and input channel select signals to the data path multiplexer over respective o_sel and in_ch links. The output channel select signals and input channel select signals set the proper data paths in the data path multiplexer.

Figure 9:
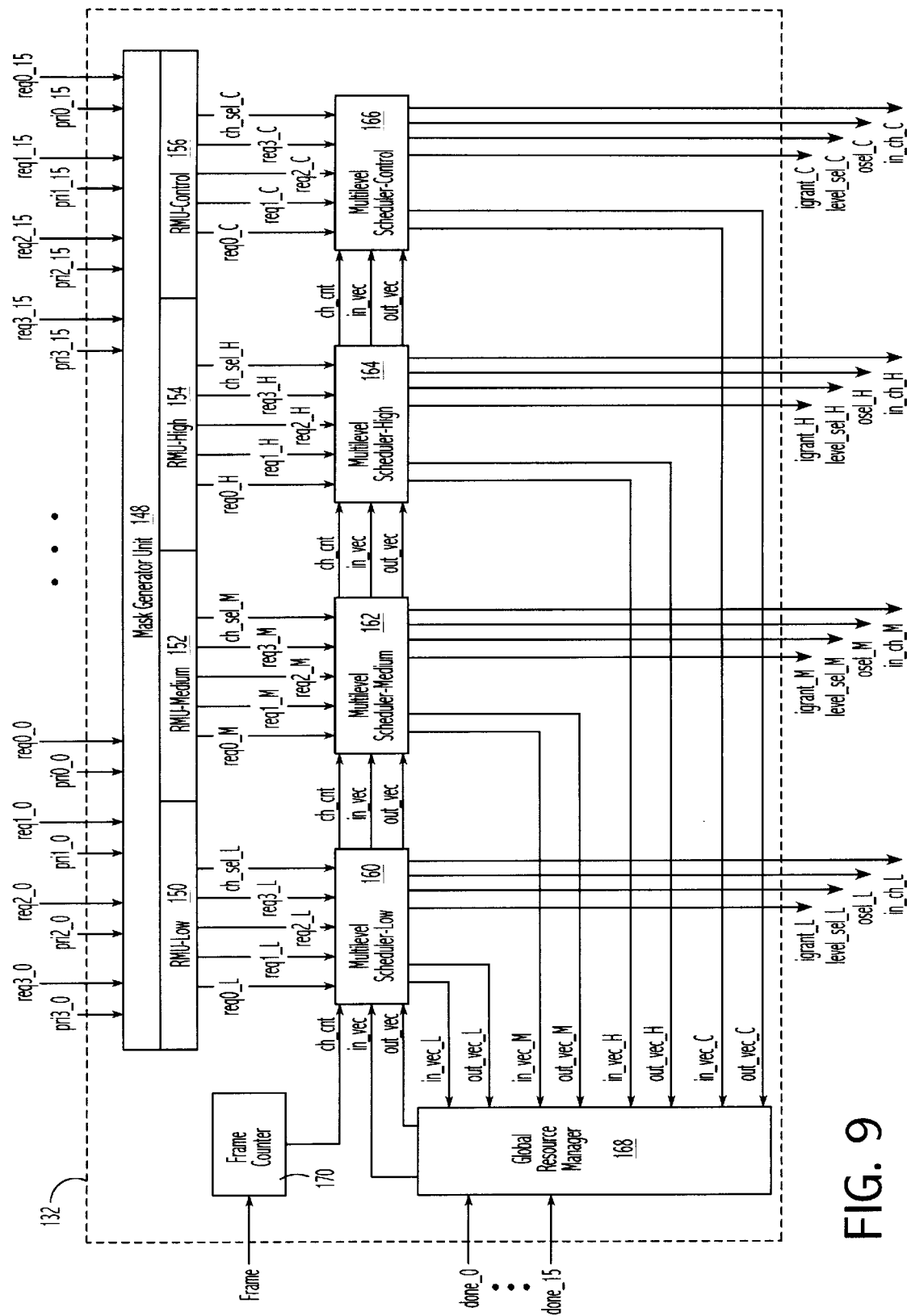
FIG. 9 is a logic diagram of the scheduler in accordance with the invention.

FIG. 9 is an expanded view of a preferred scheduler 132 in accordance with the invention. Functional blocks within the scheduler include a mask generator unit 148, four QoS priority-specific request multiplexing units (RMUs) 150, 152, 154, and 156, four QoS priority-specific multilevel schedulers (MLSs) 160, 162, 164, and 166, a global resource manager (GRM) 168, and a frame counter 170. The individual functional blocks are described in detail below.

The mask generator unit 148 is a circuit that generates three QoS priority-specific masks that are utilized in the arbitration process to indicate which output channels are identified by service requests having a QoS priority level higher than a designated minimum QoS priority level. There are only three masks, since there is no higher priority level when the control priority is the designated minimum QoS priority level. In the preferred 16×16 switch, QoS priority-specific masks consist of 16-bit vectors, where each bit is dedicated to one of the output channels. The QoS priority-specific masks are generated by accessing all sixty-four of the QoS prioritized requests that are made available to the scheduler and identifying the priority of each request. Each priority-specific mask vector is configured to represent all of the output channels for requests having a priority greater than the designated minimum QoS priority of that mask vector. The three QoS priority-specific masks are generated from the control, high, and medium priority requests. Specifically, the control priority mask (MASK_C) is a 16-bit vector that represents all outputs which are being requested by control priority requests. The high priority mask (MASK_H) is a 16-bit vector that represents all outputs that are being requested by control priority requests and high priority requests. The medium priority mask (MASK_M) is a 16-bit vector that represents all outputs which are being requested by control priority requests, high priority requests, and medium priority requests.

Figure 10:
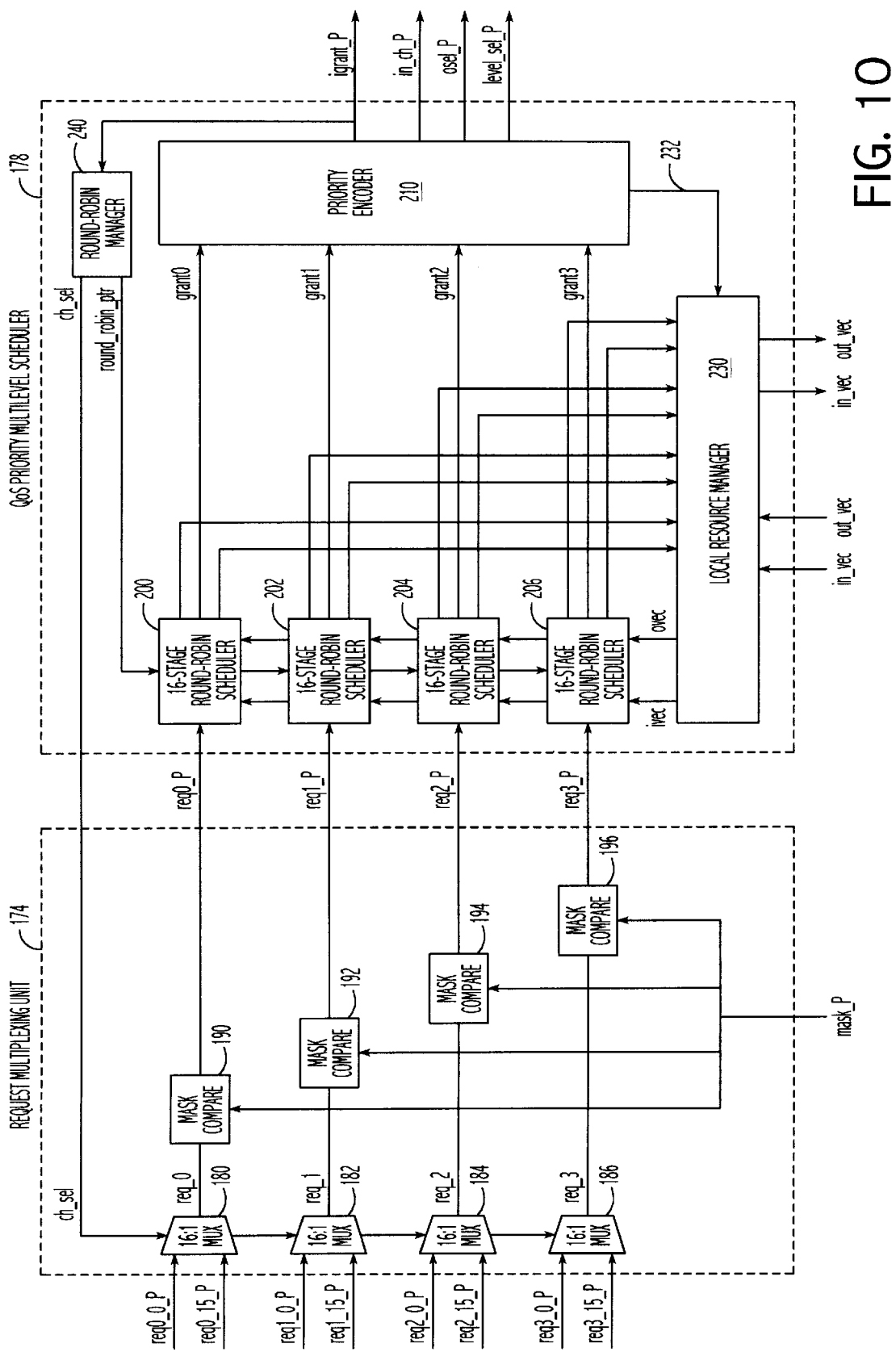
FIG. 10 is an expanded logic diagram of a request multiplexing unit and a multilevel scheduler as shown in FIG. 9 in accordance with the invention.

The next functional blocks of FIG. 9 are the four QoS priority-specific RMUs 150–156. The RMUs are circuits that sort all of the incoming requests based on QoS priority and then compare the sorted requests to the QoS priority-specific masks. The priority-specific RMUs output up to four requests (one for each of the four request buffer priorities) to attached MLSs 160–166 for each input channel on a channel-by-channel basis. FIG. 10 includes a more detailed logic diagram of a generic QoS priority-specific RMU 174 and a corresponding MLS 178, although it should be noted that the preferred scheduler includes four QoS priority-specific RMU/MLS combinations. As shown in FIG. 10, each RMU is connected to all sixty-four of the available requests via 16:1 multiplexers 180, 182, 184, and 186 that are specific to the four register levels of the request buffers 122–128. That is, the first multiplexer 180 is connected to all sixteen (input channels 0–15) of the L0 request registers, the second multiplexer 182 is connected to all sixteen of the L1 request registers, and so on.

In operation, using the control priority RMU 156 of FIG. 9 for example, the RMU cycles through the requests for each channel and sorts out any requests that are identified as control priority. If a particular channel, for example channel 0, has any control priority requests active in request buffer priority level 0, level 1, level 2, or level 3, then the requests will be forwarded through the control priority RMU. In the case of the high, medium, and low priority RMUs 154, 152, and 150, the forwarded requests are sent through mask compare units 190, 192, 194, and 196 of FIG. 10. However, in the case of the control priority RMU 156, mask compare units are not necessary, because there are no higher priority requests that need to be masked out of the MLS 160.

The mask compare process is unique for each of the high, medium, and low priority RMUs 154, 152, and 150. In the high priority RMU 154, up to four high QoS priority requests from each channel module are compared to the control priority mask (MASK_C) in order to mask out any requests that identify output channels that will be requested by control priority requests. In the medium priority RMU 152, up to four medium QoS priority requests from each channel module are compared to the high priority mask (MASK_H) in order to mask out any requests that identify output channels that will be requested by either control priority requests or high priority requests. Likewise, in the low priority RMU 150, the medium priority mask (MASK_M) is utilized to mask low priority requests, with the MASK_M reflecting requests from all higher QoS priorities. The mask compare process prevents conflicting lower priority requests from entering the MLSs and guarantees that each input only receives a single grant in one arbitration cycle and that each output is allocated to only one input. No masking process is required in the control priority RMU 156 because control priority is the highest QoS priority.

Once the mask compare process is complete, any remaining requests from the four request buffer priority levels that have not been masked out are forwarded to the QoS priority-specific MLSs 160–166. As shown in both FIGS. 9 and 10, the RMUs 150–156 and 174 output up to four request buffer priority requests to the respective MLSs 160–166 and 178 and receive a channel select (CH_SEL) signal from the MLS. The channel select signal controls which of the sixteen channels is active as the scheduler cycles through each of the sixteen channels.

Referring to FIG. 9, the next functional blocks are the four QoS priority-specific MLSs 160–166, one for each of the control, high, medium, and low priorities. The integration of each MLS into the overall scheduler is shown in FIG. 9 and the details of a generic MLS 178 are shown in FIG. 10. The MLSs receive QoS priority-sorted and masked (except control priority) requests from the RMUs and utilize a strict request buffer priority scheme to arbitrate among requests of the same QoS priority and from the same channel. In addition, the MLSs utilize a round-robin scheme to arbitrate among requests of the same QoS priority but different channels. Referring to FIG. 10, each QoS priority-specific MLS includes four 16-stage round-robin schedulers 200, 202, 204, and 206, with the four round-robin schedulers corresponding to the four request buffer priorities (L0, L1, L2, and L3). In operation, the round-robin schedulers receive request buffer prioritized requests from the RMUs for a single QoS priority and a single channel and then compare input and output vectors (ivec and ovec) to the requesting channel and to the request vector to determine if channel conflicts exist. If no channel conflict exists between the input vector, the output vector, the requesting channel, and the request vector, a request buffer priority-specific grant (i.e., grant0, grant1, grant2, grant3) is issued to the priority encoder. Each time a grant is issued from a round-robin scheduler, the input and output vectors are updated and sent to the local resource manager to reflect the new grant.

The priority encoder unit 210 within each MLS 160–166 and 178 is a QoS priority-specific circuit that is responsible for implementing the request buffer priority order and issuing the final QoS priority-specific grants to the channel modules. When there are one or more possible grants transmitted to the priority encoder unit from the four 16-stage round-robin schedulers in the current scheduling cycle, the priority encoder unit picks the grant corresponding to the request with the highest request buffer priority and passes the QoS priority-specific grant and a level select on to the requesting channel module through the QoS priority links and the level select link identified in FIGS. 7 and 8. In addition to the grants and level selects, referring to FIGS. 9 and 10, the priority encoders transmit output channel select (o_sel) and input channel select (in_ch) signals to the data path multiplexer to configure new channel connections. The priority encoder unit also identifies to the local resource manager 230 which grant has been issued, so that the local resource manager can update the local input and output vectors (ivec and ovec).

The local resource manager 230 shown in FIG. 10 is responsible for maintaining the QoS priority-specific input vectors (ivec) and output vectors (ovec) during each 16-stage arbitration cycle. For example, each local resource manager receives updated input and output vectors (in_vec and out_vec) from the global resource manager 168 at the start of each 16-stage arbitration cycle. As described above, each time a grant is issued to a particular channel within a particular MLS 178, the local input vector (ivec) and output vector (ovec) are updated appropriately by the local resource manager of the MLS. Specifically, updated input and output vectors from each 16-stage round-robin scheduler are sent to the local resource manager. When the priority encoder issues the highest priority grant, the priority encoder also identifies to the local resource manager through link 232 which grant has been issued and therefore which input and output vectors should be used to update the local input and output vectors. Upon completion of a 16-stage arbitration cycle, QoS priority-specific local input vectors (in_vec) and output vectors (out_vec) are sent from each local resource manager to update the global resource manager.

Referring back to FIG. 9, the global resource manager 168 is responsible for maintaining the status of global input and output vectors (in_vec and out_vec, respectively). The global resource manager receives updated local input and output vectors from each MLS 160–166 at the completion of each arbitration cycle. Upon receiving the QoS priority-specific local input and output vector updates, the input vector bits related to the input channels that received grants and the output vector bits related to the output channels that are going to be used in the incoming packet transfer are marked as busy. The updated global input and output vectors are then supplied to each local resource manager for the next arbitration cycle.

When the end of packet transfers are signaled to the global resource manager by the channel modules using the done signals, the respective input vector bits and output vector bits marked during the arbitration cycle are cleared in the next cycle, so that the channels can be scheduled for another transfer. Determining available output channels from a done signal that indicates the availability of an input channel is accomplished through a look-up table. The look-up table is updated each time a grant is issued to an input channel. The look-up table identifies which output channels will be utilized by the input channel for the granted cell transfer. When a done signal is received by the scheduler, the look-up table for the corresponding input channel is accessed and the identified output channels in the look-up table are released and made available for future switching.

The frame counter 170, shown in FIG. 9, provides timing signals (ch_cnt) in the form of clock signals and framing pulses to the MLSs. As stated above with reference to FIG. 6, each frame lasts eighteen clocks, and the 16-stage round-robin scheduling occurs within each MLS 160–166 during each frame. The timing signals provided by the frame counter ensure that the four parallel arbitration processes are synchronized.

Referring to FIG. 10, the round-robin arbitration scheme utilized by each QoS priority-specific MLS 178 promotes fairness among requests of the same QoS priority level. The round-robin scheme and the channel selection scheme of the RMU are controlled by the round-robin manager 240. The round-robin manager also controls the activation of channels in the RMUs through the ch_sel signal. Under the round-robin scheme, initially, channel 0 is designated as having the highest round-robin channel priority and channel 15 is designated as having the lowest round-robin priority. Note that round-robin priority is relevant to the channel priority order inside each of the four 16-stage round-robin schedulers and is different from the request buffer priority and the QoS priority. Inside each MLS, requests are processed between channels in round-robin priority order such that requests from channels with higher round-robin priority are granted access to output channels before requests from lower round-robin priority channels. Once a channel receives a grant, the local resource manager is updated and lower priority channels are prevented from obtaining a conflicting grant in subsequent stages of the 16-stage arbitration cycle. Once the channel with the highest round-robin priority receives a grant, the highest round-robin priority designation is rotated to the next input channel with a pending request. Under the rotating round-robin channel priority approach, every channel will periodically be designated as the highest priority. The round-robin priority is managed independently for each MLS, such that each MLS may be identifying a different channel as high round-robin priority during the same arbitration cycle. Managing round-robin priority independently for each MLS makes it possible to maintain round-robin fairness in the presence of mixed QoS priority traffic that is targeted at different output channels.

High round-robin priority designation plays an especially important role in allowing multicast transmissions through a switch. Multicast requests are difficult to schedule in high-traffic environments because the likelihood that all output channels are available is low. To guarantee bounded latency for multicast and broadcast traffic, when a channel is designated as the highest round-robin priority, any output channels requested by the channel will be reserved by the scheduler, unless the output channels are required by requests from other channels with higher QoS priority, until all of the output channels required to grant the requests become available.

Although the functions of the overall scheduler 132 unit have been specifically described, it is important to note that the functions may be performed in different orders. For example, it is possible to perform the round-robin scheduling function before the mask compare function. In addition, the process of accounting for input and output channel availability as performed by the local resource manager 230 or the global resource manager 168 may differ. Further, the physical boundaries may vary from those described. For example, certain functions such as mask generation may be performed outside the physical boundaries of the scheduler.

Figure 11A:
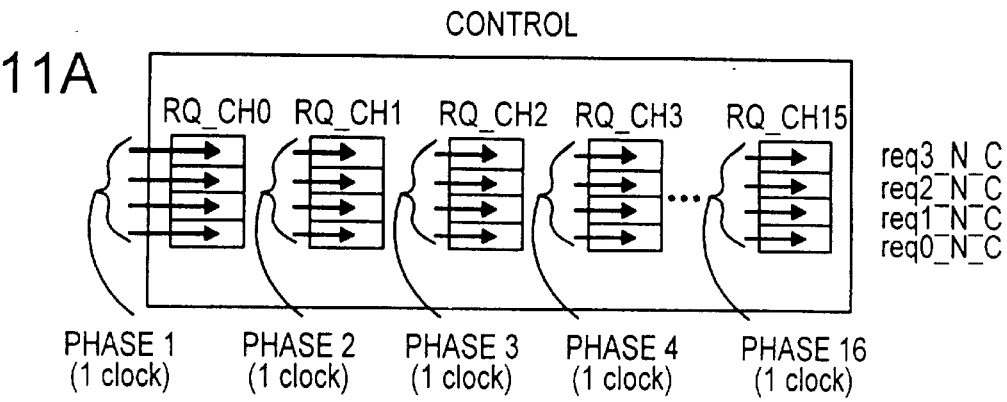
FIG. 11A is a depiction of the preferred arbitration process for the control QoS priority in accordance with the invention.
Figure 11B:
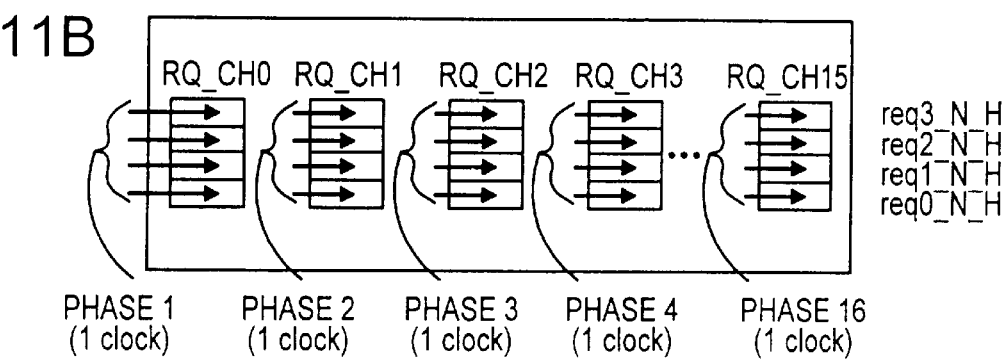
FIG. 11B is a depiction of the preferred arbitration process for the high QoS priority in accordance with the invention.
Figure 11C:
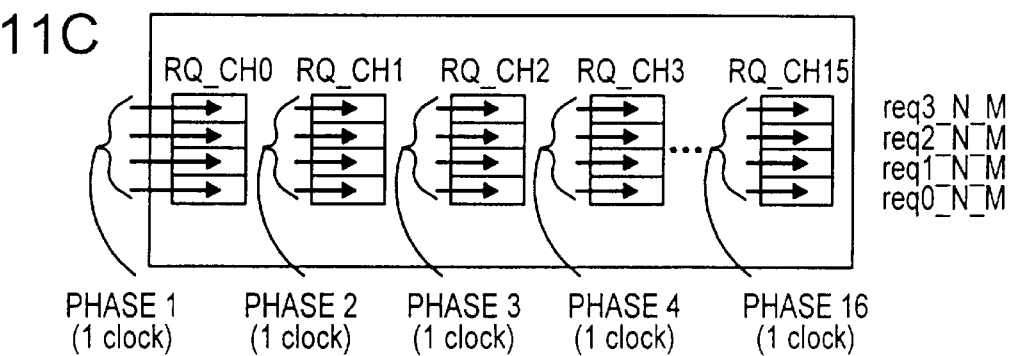
FIG. 11C is a depiction of the preferred arbitration process for the medium QoS priority in accordance with the invention.
Figure 11D:
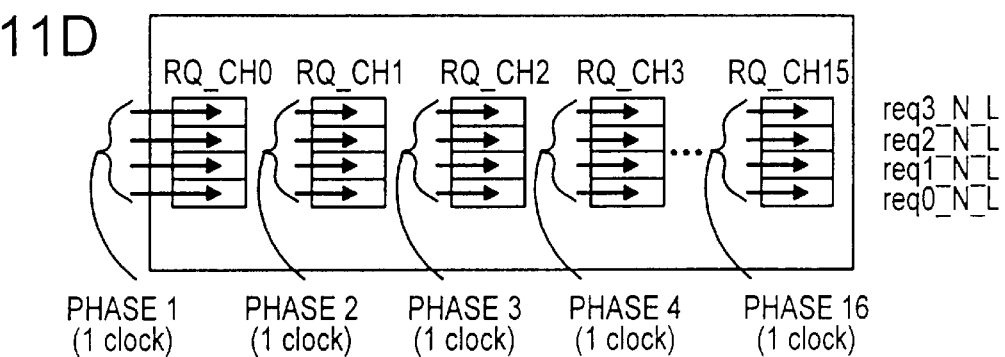
FIG. 11D is a depiction of the preferred arbitration process for the low QoS priority in accordance with the invention.

The preferred multi-priority arbitration method is further explained with reference to FIGS. 11A–11D, which graphically represent the arbitration of QoS priority sorted requests from a 16-channel multipoint switch having four request registers per channel. As described above, the arbitration process is separated into four parallel QoS priority-specific operations. FIG. 11A graphically represents the arbitration of all control priority requests that could possibly be stored in the sixteen four-level request buffers. FIG. 11B graphically represents the arbitration of all high priority requests that could possibly be stored in the sixteen four-level request buffers. FIGS. 11C and 11D represent the medium and low priority requests respectively. Requests are identified at the right of each matrix as, for example, "req3_N_C" where "req3" refers to request buffer priority level 3, where "N" refers to one of the sixteen channels identified as 0–15, and where "C" refers to the control QoS priority level. It should be noted that the sixty-four possible requests are distributed throughout the four QoS priorities such that if channel 0 has a control priority request stored at level 0 (FIG. 11A), then there will be no request identified for channel 0, level 0 at either the high, medium, or low priority matrices (FIGS. 11B–11C).

As explained above, in the preferred arbitration method, request buffer priority refers to the priority level of one buffered request for a channel versus another buffered request for the same channel with both requests having the same QoS priority. In addition, time is used as the request buffer priority basis between requests of the same QoS priority. Under the time approach, L0 contains the oldest request in a buffer and therefore has the highest request buffer priorities. Request buffer levels 1, 2, and 3 contain sequentially newer requests and have sequentially lower request buffer priority. Round-robin priority refers to the channel that is designated as high round-robin priority under the rotating round-robin channel priority scheme. As described above, once a channel is designated as high round-robin priority, the channel maintains the designation for successive arbitration cycles until a grant is issued for the channel. Round-robin assignment of the highest priority channel is distributed sequentially in descending order independently for each of the four QoS priorities. For an example of the round-robin priority, referring to FIG. 11A, if CH13 is the highest round-robin priority channel, CH14 is the next highest round-robin priority, CH15 is the next highest round-robin priority, and CH0 is the next highest round-robin priority, with the pattern continuing until CH12, which is the lowest round-robin priority channel for the control QoS priority-specific MLS. At the same time CH13 has the highest round-robin priority for the control MLS, CH1 can have the highest round-robin priority for the high MLS (FIG. 11B).

With the priority protocol established, the preferred multilevel in-parallel arbitration (MLIPA) process is described with reference to FIG. 11A for the control priority MLS, although it should be noted that simultaneous arbitration processes are taking place in the high, medium, and low MLSs as depicted in FIGS. 11B–11D. In the example, it is assumed that request buffer level 0 is designated high request buffer priority and channel 0 has the highest round-robin priority. Therefore, in the first clock, phase 1, the four requests, req0_0_C, req1_0_C, req2_0_C, and req3_0_C are arbitrated as described above. Simultaneously, the level 0 through level 3 requests are processed through the control priority RMU and the control priority MLS. Out of the parallel process, if possible one request from one of the four request buffer priority levels will receive a grant. Remembering that CH0 is the highest priority channel, if a request is present at channel 0, it is likely that a grant will be issued. If a request is present at level 0, then it is likely to receive the grant even if it is a multicast request that requires available output channels to be reserved until unavailable output channels become available.

In the next clock, phase 2 of FIG. 11A, the four requests, req0_1_C through req3_1_C for channel 1 are arbitrated as described above. The arbitration of the four requests is performed in parallel and, if possible, one request is issued for the channel. In the next clock, phase 3, the four requests, req0_2_C through req3_2_C for channel 2 are arbitrated as described above. Parallel arbitration processes take place for the high, medium, and low priorities. As can be seen, the multilevel arbitration continues for sixteen clocks and at the end of sixteen clocks up to sixty-four QoS priority-specific requests have been arbitrated for each QoS priority level, as shown in FIGS. 11A–D, and grants have been issued in a manner that maximizes input channel and output channel utilization while maintaining QoS prioritization.

A complete arbitration cycle requires eighteen clocks, two clocks for arbitration preparation and sixteen clocks for arbitration. The sixteen clocks that are required to arbitrate up to sixty-four requests of each QoS priority are synchronized to the sixteen clocks that are required to transmit the data cell portion of a switching cell, as described with reference to FIG. 6. Before a new sixteen clock arbitration process begins, and during the two clocks required to transmit the command cell portion of the next switching cell, preparations are made for the next arbitration process. In the first clock, all of the done signals are reviewed and the channels that have become available during the preceding arbitration cycle are released by clearing the appropriate input vectors and output vectors in the global resource manager. Additionally, in the first clock the request buffers are replenished to fill request registers vacated by the requests that were granted in the last arbitration cycle. In the second and last clock before the next arbitration begins, new QoS priority-specific masks that reflect the newly replenished buffers are generated for the three QoS priority levels (control, high, and medium), the input and output vectors of the local resource managers are updated, and the round-robin priority for each MLS is rotated if the highest round-robin priority channel received a grant in the last arbitration cycle.

In an alternative arbitration method, the requests in the request buffers can be arbitrated one request at a time, one packet priority level at a time. In the preferred embodiment with sixteen channels and four request registers per channel, the arbitration process would arbitrate sixty-four QoS priority-specific requests in sixty-four clocks. The arbitration would start at the highest round-robin priority and highest request buffer priority request. Phase 1 requires sixteen clocks, phase 2 requires sixteen clocks, phase 3 requires sixteen clocks, and phase 4 requires sixteen clocks for a total of sixty-four clocks. Grants are issued on a first request-first grant basis with the round-robin priority rotating each arbitration cycle as described above.

Although the system and method are described as having sixteen channels, four requests per channel, and four QoS priorities, different numbers of channels, requests per channel, and channel priorities are possible.

Figure 12:
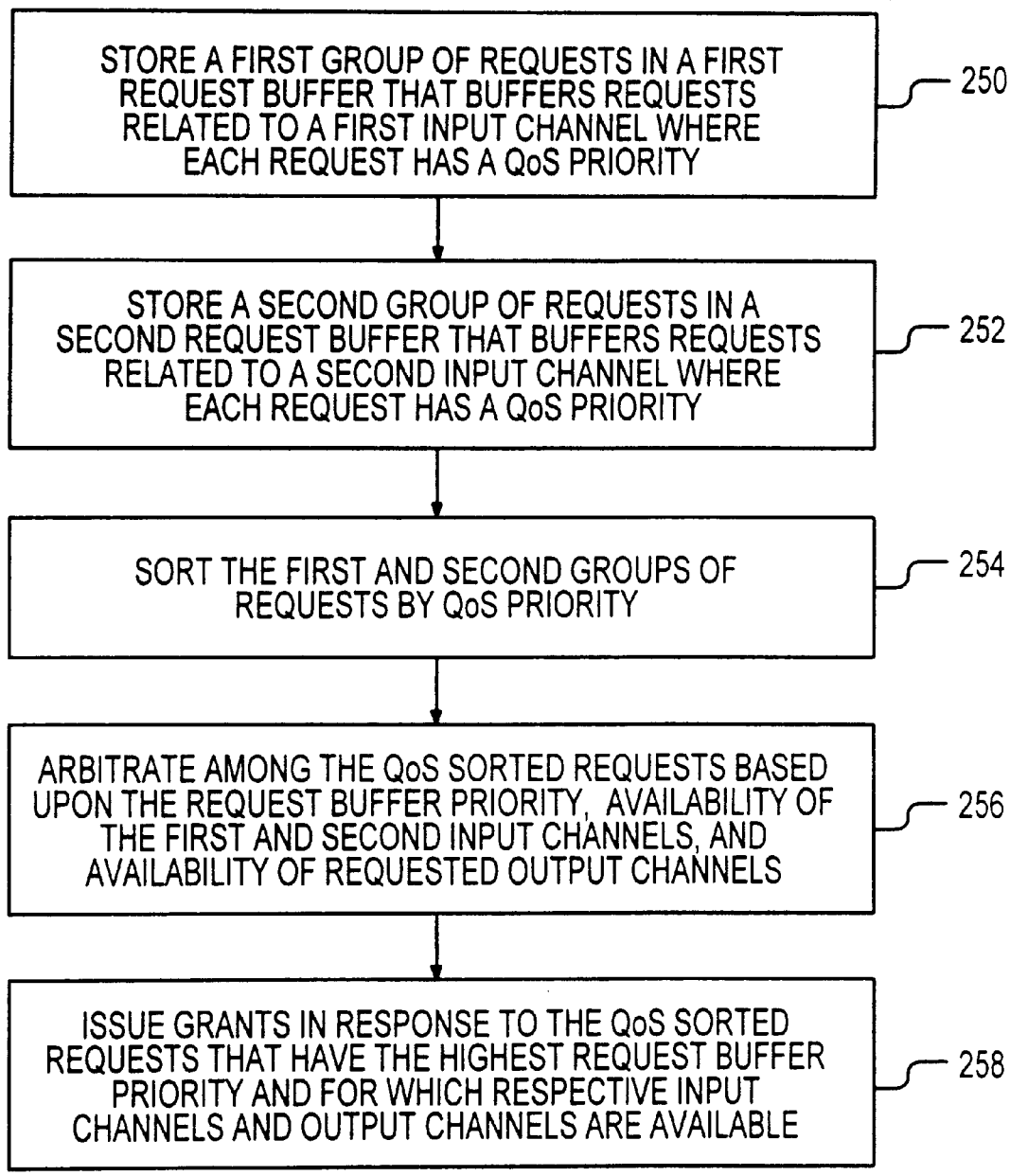
FIG. 12 is a depiction of a preferred method of scheduling cells in accordance with the invention.

A preferred method for scheduling transmission of switching cells across an input-buffered network switch is described with reference to FIG. 12. In a step 250, a first group of requests is stored in the first request buffer that buffers requests related to a first input channel where each request has a QoS priority. In step 252, a second group of requests is stored in a second request buffer that buffers requests related to a second input channel where each request has a QoS priority. In step 254, all of the requests are sorted by QoS priority. In step 256, the QoS sorted requests are arbitrated based upon said request buffer priority, availability of said first and second input channels, and availability of requested output channels. In step 258, grants are issued in response to the QoS sorted requests that have a highest request buffer priority for which respective input channels and output channels are available.

What is claimed is:

1. An apparatus for scheduling packets in an input-buffered multipoint switch comprising:

a plurality of input channels;

a plurality of output channels;

multilevel request buffers, each multilevel request buffer being specific to one of said plurality of input channels, said multilevel request buffers having discrete buffer priority levels for storing requests having alternative quality of service (QoS) priorities, said requests having specific request buffer priorities that are determined by the discrete buffer priority level in which said requests are stored; and scheduler means in communication with said multilevel request buffers for indicating a transmission status for each of said input and output channels, said transmission status being indicative of channel availability, arbitrating among selected requests which have an equal QoS priority and which are stored in any of said discrete buffer priority levels of said multilevel request buffers, said arbitrating being at least partially based upon a combination of said request buffer priorities and said transmission statuses of said input and output channels, and issuing grants to said requests in a channel-by-channel sequence based upon said arbitrating among said selected requests having equal QoS priority.

2. The apparatus of claim 1 further comprising parallel links between each discrete buffer priority level of said multilevel request buffers and said scheduler means, said scheduler means being enabled to simultaneously access all of said discrete buffer priority levels of each said request buffer.

3. The apparatus of claim 2 further comprising additional parallel links between said multilevel request buffers and said scheduler means, wherein said additional parallel links carry QoS priority indicators that are related to said stored requests.

4. The apparatus of claim 1 wherein said scheduler means includes a mask generator circuit operationally connected to said multilevel request buffers to generate mask vectors that are indicative of each output channel that is requested at each of said alternative QoS priorities except the lowest QoS priority, each said mask vector being associated with one of said QoS priorities.

5. The apparatus of claim 4 wherein said scheduler means further includes QoS priority-specific mask comparator circuits operationally connected to said mask generator circuit and said multilevel request buffers to compare said mask vectors to associated requests.

6. The apparatus of claim 5 wherein said scheduler means further includes a plurality of QoS priority-specific scheduler circuits, each QoS priority-specific scheduler circuit being operationally connected to an associated output of said mask comparator circuit to generate a QoS priority-specific grant for a request having an available input channel and available requested output channels.

7. The apparatus of claim 6 wherein said scheduler means further includes QoS priority-specific priority encoder circuits operationally connected to said QoS priority-specific scheduler circuits to select a highest priority grant from all grants generated from said QoS priority-specific scheduler circuits for a specific channel and to transmit said selected highest priority grant to an input channel that corresponds to said selected highest priority request.

8. A method for scheduling transmissions of switching cells across an input-buffered network switch that connects a plurality of input channels to a plurality of output channels, each switching cell being associated with one of said plurality of input channels, said method including the steps of:

storing a first plurality of requests in a first request buffer that buffers requests related to a first input channel, each said request corresponding to one of said switching cells and having a request buffer priority and a quality of service (QoS) priority;

assigning request buffer priorities to each of said first plurality of requests ranging from highest request buffer priority to lowest request buffer priority;

storing a second plurality of requests in a second request buffer that buffers requests related to a second input channel, each said request corresponding to one of said switching cells and having a request buffer priority and a QoS priority;

assigning request buffer priorities to each of said second plurality of requests ranging from highest request buffer priority to lowest request buffer priority;

accessing each request of said first and second pluralities of requests in parallel such that requests of all said request buffer priorities are accessed simultaneously;

sorting said first and second pluralities of requests by QoS priority;

arbitrating among said accessed and QoS sorted requests based upon said request buffer priority, availability of said first and second input channels, and availability of requested output channels; and issuing grants in response to said arbitration to said accessed and QoS sorted requests that have a highest request buffer priority and for which respective input channels and output channels are available.

9. The method of claim 8 further including a step of receiving a done signal that indicates the completion of a transmission of switching cells related to a single packet.

10. The method of claim 8 wherein said step of arbitrating includes a step of arbitrating requests one channel at a time in descending channel priority from a highest channel priority to a lowest channel priority.

11. The method of claim 8 wherein said step of arbitrating includes a sub-step of arbitrating all requests of a same QoS priority stored in a request buffer associated with a particular input channel in parallel.

12. The method of claim 11 wherein said step of arbitrating requests of the same QoS priority in parallel includes a step of executing said arbitrations in a fixed sequence with respect to said input channels.

13. The method of claim 11 wherein said step of arbitrating requests of the same QoS priority includes sub-steps of:

generating masks that represent all requests having a QoS priority that is equivalent to or higher than a designated QoS priority; and comparing a mask for said designated QoS priority to a request having a lower QoS priority to determine availability of output channels required by said request.

14. The method of claim 11 further including the steps of:

identifying an input channel having a highest round-robin priority among said plurality of input channels for arbitration purposes; and reserving requested output channels for a multicast request when said multicast request is associated with an input channel that has said highest round-robin priority among said plurality of input channels.

15. An apparatus for scheduling cells in an input-buffered multipoint switch having input channels and output channels, wherein said cells have been assigned a particular quality of service (QoS) priority and wherein requests identify desired output channels for corresponding cells, comprising:

a request buffer specific to each one of said input channels, each said request buffer having a plurality of register levels for storing requests of corresponding request buffer priority levels;

a QoS priority indicator buffer specific to each one of said input channels, each said QoS priority indicator buffer having a plurality of register levels that are directly related to said register levels of said request buffers for storing QoS priority indicators that correspond to said requests stored in said request buffers;

means, connected to said request buffers and said QoS priority indicator buffers, for sorting said requests by QoS priority;

means, connected to said means for sorting, for arbitrating among said sorted requests on a QoS priority basis and for issuing request grants to highest request buffer priority requests that have available input channels and available output channels;

a scheduler and first parallel data links between each register level of said request buffers and said means for sorting to provide said scheduler with simultaneous access to all of said requests stored in all of said request buffers; and second parallel data links between each register level of said QoS priority indicator buffers and said means for sorting that provide said scheduler with simultaneous access to all of said QoS priority indicators stored in all of said QoS priority indicator buffers.

16. The apparatus of claim 15 further comprising a means for generating a mask vector that represents an aggregate of requested output channels for a minimum QoS priority level, said means for generating a mask vector being operatively connected to said request buffers.

17. The apparatus of claim 16 further comprising a means for performing parallel mask comparisons between said mask vector and requests from respective QoS priority levels for a particular input channel to indicate output channel conflicts between requests, said means for performing parallel mask comparisons being operatively connected to said means for generating said mask vector.

18. The apparatus of claim 17 further comprising a means, specific to each QoS priority, for performing request buffer priority-specific scheduling between said QoS priority sorted requests from respective request buffer priority levels, available input and output channels, and a round-robin channel priority, said means for performing request buffer priority-specific scheduling having three outputs per request buffer priority level, a request buffer priority-specific request grant, an updated input channel vector, and an updated output channel vector.

19. The apparatus of claim 18 further comprising a means for selecting which request buffer priority-specific grant has a highest priority among all request buffer priority-specific grants for a single input channel and for transmitting said selected request grant from said means for selecting.

20. An apparatus for scheduling packets in an input-buffered multipoint switch comprising:

a plurality of input channels;

a plurality of output channels;

multilevel request buffers, each multilevel request buffer being specific to one of said plurality of input channels, said multilevel request buffers having discrete levels for storing requests having alternative quality of service (QoS) priorities, said requests having specific request buffer priorities that relate to said discrete levels within said multilevel request buffers; and scheduler means in communication with said multilevel request buffers for
  indicating a transmission status for each of said input and output channels, said transmission status being indicative of channel availability,
  arbitrating among selected requests which have an equal QoS priority and which are stored in any of said levels of said plurality of multilevel request buffers, said arbitrating being at least partially based upon a combination of said request buffer priorities and said transmission statuses of said input and output channels, and
  issuing grants to said requests in a channel-by-channel sequence based upon said arbitrating among said selected requests having equal QoS priority;
  said scheduler means including a mask generator circuit operationally connected to said multilevel request buffers to generate mask vectors that are indicative of each output channel that is requested at each of said alternative QoS priorities except the lowest QoS priority, each said mask vector being associated with one of said QoS priorities.

21. The apparatus of claim 20 wherein said scheduler means further includes QoS priority-specific mask comparator circuits operationally connected to said mask generator circuit and said multilevel request buffers to compare said mask vectors to associated requests.

22. The apparatus of claim 21 wherein said scheduler means further includes a plurality of QoS priority-specific scheduler circuits, each QoS priority-specific scheduler circuit being operationally connected to an associated output of said mask comparator circuit to generate a QoS priority-specific grant for a request having an available input channel and available requested output channels.

23. The apparatus of claim 22 wherein said scheduler means further includes QoS priority-specific priority encoder circuits operationally connected to said QoS priority-specific scheduler circuits to select a highest priority grant from all grants generated from said QoS priority-specific scheduler circuits for a specific channel and to transmit said selected highest priority grant to an input channel that corresponds to said selected highest priority request.

* * * * *